(12) United States Patent
Haaf et al.

(10) Patent No.: US 11,047,394 B2
(45) Date of Patent: Jun. 29, 2021

(54) FLOW RECTIFIER OF A FAN

(71) Applicant: ebm-papst Mulfingen GmbH & Co. KG, Mulfingen (DE)

(72) Inventors: Oliver Haaf, Kupferzell (DE); Thomas Heli, Langenburg (DE); Daniel Gebert, Öhringen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 545 days.

(21) Appl. No.: 15/683,114

(22) Filed: Aug. 22, 2017

(65) Prior Publication Data

US 2018/0058459 A1    Mar. 1, 2018

(30) Foreign Application Priority Data

Aug. 23, 2016 (DE) ...................... 10 2016 115 616.7

(51) Int. Cl.
*F01B 25/26* (2006.01)
*F04D 27/00* (2006.01)
(Continued)

(52) U.S. Cl.
CPC ......... *F04D 27/001* (2013.01); *F04D 29/325* (2013.01); *F04D 29/701* (2013.01);
(Continued)

(58) Field of Classification Search
CPC .... F04D 27/001; F04D 29/325; F04D 29/701; F04D 29/703; G01F 1/34; F05D 2270/301
(Continued)

(56) References Cited

U.S. PATENT DOCUMENTS 3,733,900 A * 5/1973 De Baun .................... G01F 1/40
                                                    73/861.66
4,050,306 A * 9/1977 Khalid .................. F01D 21/003
                                                    73/861.64
(Continued)

FOREIGN PATENT DOCUMENTS

CN            102680031    *  9/2012   ............... G01F 1/34
DE      20 2014 105284 U1    12/2014
(Continued)

OTHER PUBLICATIONS

European Search Report, European Application No. 1715975.4, dated Jan. 29, 2018, 5 pgs.
(Continued)

*Primary Examiner* — Hung Q Nguyen
*Assistant Examiner* — Anthony Donald Taylor, Jr.
(74) *Attorney, Agent, or Firm* — Dickinson Wright PLLC

(57) ABSTRACT

The present disclosure relates to a current rectifier for being arranged on the suction area of a ventilator, with an axial initial flow side and an axial exit flow side, wherein the current rectifier comprises several crossing struts formed by at least one circumferential strut and by at least one radial strut, and a pressure measuring conduit is constructed at least in one of the struts and which comprises at least one opening facing the exit flow side, and wherein the pressure measuring conduit comprises a measuring opening for being connected to a measuring line for the connection to a pressure sensor or a pressure sensor is integrated in the pressure measuring conduit.

20 Claims, 3 Drawing Sheets

(51) Int. Cl.
  *F04D 29/70* (2006.01)
  *F04D 29/32* (2006.01)
  *G01F 1/34* (2006.01)

(52) U.S. Cl.
  CPC ............. *F04D 29/703* (2013.01); *G01F 1/34* (2013.01); *F05D 2270/301* (2013.01)

(58) Field of Classification Search
  USPC ........................................................ 415/118
  See application file for complete search history.

(56) References Cited

U.S. PATENT DOCUMENTS

| | | | | |
|---|---|---|---|---|
| 4,905,511 | A * | 3/1990 | Reinhold | F04D 27/00 73/168 |
| 5,586,861 | A * | 12/1996 | Berger | F04D 27/00 415/118 |
| 6,116,095 | A * | 9/2000 | Radle | G01F 1/34 62/244 |
| 6,186,744 | B1 * | 2/2001 | Wolochuk | F04D 27/001 417/44.2 |
| 6,241,463 | B1 | 6/2001 | Bahner et al. | |
| 8,366,377 | B2 * | 2/2013 | Smiley, III | F04D 27/001 415/1 |
| 2007/0261410 | A1 * | 11/2007 | Frank | F01D 17/105 60/785 |
| 2013/0045085 | A1 | 2/2013 | Frank et al. | |
| 2014/0209275 | A1 * | 7/2014 | Schone | F04D 29/541 165/96 |
| 2015/0330411 | A1 * | 11/2015 | Heli | F04D 29/542 415/208.2 |
| 2016/0053767 | A1 * | 2/2016 | Morgan | F04D 29/023 415/1 |

FOREIGN PATENT DOCUMENTS

| | | | | |
|---|---|---|---|---|
| DE | 202014105284 | * | 12/2014 | ........... F04D 29/703 |
| DE | 10 2015 113147 A1 | | 2/2016 | |
| EP | 0 887 555 A1 | | 12/1998 | |
| EP | 2 778 432 A1 | | 7/2014 | |

OTHER PUBLICATIONS

German Search Report, German Application No. 10 2016 15 616.7, dated Jul. 12, 2017, 2 pgs.

* cited by examiner

FLOW RECTIFIER OF A FAN

RELATED APPLICATIONS

The present patent document claims the benefit of priority to German Application No. 10 2016 115 616.7 filed on Aug. 23, 2016, the entire contents of which are incorporated herein by reference.

FIELD

The present disclosure relates to a current rectifier of a ventilator, i.e. a flow rectifier of a fan.

BACKGROUND

Generic current rectifiers are known from the publications of the prior art, for example, EP 2 778 432 A1.

In many application of ventilation and air conditioning technology it is necessary to determine the required volumetric flow of a blower or ventilator and to constantly regulate it. In addition, in such applications the requirements for the lowest possible ventilator noise are high.

Traditionally, compressor drum ventilators are used in ventilation and air conditioning technology since they are distinguished under disturbed inflow conditions by a good noise behavior. The determination of the volumetric flow is possible in compressor drum ventilators by a clear connection between the power consumption and the volumetric flow at a constant speed. However, the relatively low degree of effectiveness in comparison to radial ventilators, in particular to blower wheels with backwardly curved blades, is disadvantageous.

Compressor drum ventilators are being displaced more and more by radial ventilators due to a rise in efficiency requirements. However, the latter have no clear connection between the power consumption and the volumetric flow at a constant speed. Therefore, another method is needed for determining the required volumetric flow. A known solution is the removal of the static pressure in the inlet nozzle of the ventilator with the aid of an annular line. The volumetric flow can be directly determined from the measured static pressure with this method. Typically, three or four pressure removal connecting pieces are connected by a line and a pressure sensor is connected by a hose line. However, such a hose line is complicated to mount and is therefore very expensive.

SUMMARY

The present disclosure simplifies the measuring of the volumetric flow of the ventilator by using already-used structural components and of realizing in this in an economical manner, for example by the feature combination according to Claim 1.

According to the present disclosure a current rectifier in the form of a preliminary line grid is suggested for being arranged on a suction area of the ventilator with an axial initial flow side and an axial exit flow side. The current rectifier comprises several crossing struts formed by at least one circumferential strut and at least one radial strut. A pressure measuring conduit is formed in at least one of the struts and comprises an opening facing the exit flow side. The pressure measuring conduit furthermore comprises in a first embodiment a measuring opening for being connected to a measuring line for the connection to a pressure sensor. In an alternative embodiment the pressure sensor is integrated in the pressure measuring conduit. The latter embodiment is especially suitable for large-dimensioned current rectifiers and correspondingly large ventilators. The data transfer of the integrated pressure sensor can take place via a signal line or by radio.

The present disclosure utilizes the physical properties of the ventilator flow, according to which a lower static pressure prevails than in the suction-side remote field before and in the inflow nozzle of the ventilator by the high flow speed. The current rectifier constructed as a preliminary line grid is positioned in this inflow area, especially in order to reduce the development of noise by the ventilator.

According to the present disclosure the means for measuring the volumetric flow is integrated in the current rectifier so that additional structural components and therefore accumulating costs and mounting expense are eliminated. The means for measuring the volumetric flow is realized by the pressure measuring conduit integrated in the struts of the current rectifier and which conduit comprises small openings to the exit flow side, that is, in the proper mounting in the ventilator. The flow produced by the ventilator at first strikes the axial inflow side of the struts of the current rectifier, flows around them and then enters into the inlet nozzle of the ventilator. The static pressure in the inflow area of the ventilator is transferred into the pressure measuring conduit via the small openings on the struts on the exit flow side, where it can be directly measured by the pressure sensor or by a measuring line connected at a distance from the current rectifier. This measured static pressure serves as a measuring magnitude of the volumetric flow. In addition, the ambient pressure and therefore the geoetic influences can be taken into account in the calculation in order to obtain an exact result of the actual volumetric flow. In addition, the more uniform flow and the reduction of inflow turbulence by the current rectifier improve the accuracy of the measuring of the static pressure on the current rectifier.

There is also a positive effect on the measuring result of the static pressure if several openings facing the exit flow side are provided which are uniformly distributed on the struts. To the extent that the openings are constructed on circumferential struts, the particular interval from each other is identical in the circumferential direction.

An advantageous variant of an embodiment provides that the pressure measuring conduit is constructed as a circumferential annular conduit in at least one circumferential strut. The distribution of pressure in the pressure measuring conduit here is uniform. An embodiment is especially favorable in which the current rectifier comprises a plurality of circumferential struts and the annular conduit is constructed in the radially outermost circumferential strut.

In order to uniformly detect the static pressure over the circumference of the current rectifier, in one embodiment the opening facing the exit flow side is constructed as a slot which is in sections or completely circumferential. Therefore, even in the case of a contamination of parts of the current rectifier or of a formation of condensate, a secure detection of pressure in the pressure measuring conduit can be ensured.

In a variant of an embodiment at least one radial strut is constructed as a hollow strut with a hollow space in the current rectifier constructed as a preliminary line grid and comprises at least one opening facing the exit flow side. A slot shape can also be selected here. The opening on the radial strut or struts can be provided alternatively or additionally to the openings or the slot on the circumferential strut or struts.

In a further development the current rectifier is characterized in that several radial struts are provided which extend into an axial center of the current rectifier, wherein the hollow spaces of each of the hollow struts are connected in the axial center. The measuring opening for connecting the measuring line and for measuring the static pressure in the pressure measuring conduit by the pressure sensor is formed in the axial center at a connection site of the hollow struts.

The current rectifier is constructed in an embodiment in a bipartite manner by a first partial element and a second partial element. This facilitates the mounting. In addition, it can be provided that the pressure measuring conduit or annular conduit is constructed partially in the first partial element and partially in the second partial element and forms a through pressure measuring space by connecting the first and the second partial elements.

Furthermore, an embodiment is advantageous in which the pressure measuring conduit or annular conduit is constructed partially in the first partial element and partially in the second partial element and forms a through pressure measuring space by connecting the first and the second partial elements.

In every variant of an embodiment a connection piece connected to the pressure measuring conduit can be provided for connecting the measuring line to the current rectifier.

Furthermore, the present disclosure comprises the ventilator with a previously described current rectifier fastened to it on the initial flow side.

All disclosed features can be combined in any manner to the extent that this is technically possible and not contradictory. Other advantageous further developments of the present disclosure are characterized in the subclaims and/or are shown in detail in the following together with the description of the preferred execution of the present disclosure using the figures.

BRIEF DESCRIPTION OF THE DRAWINGS

In the figures.

The same reference numbers designate the same parts in all views.

DETAILED DESCRIPTION OF SPECIFIC EMBODIMENTS

Figure 1:
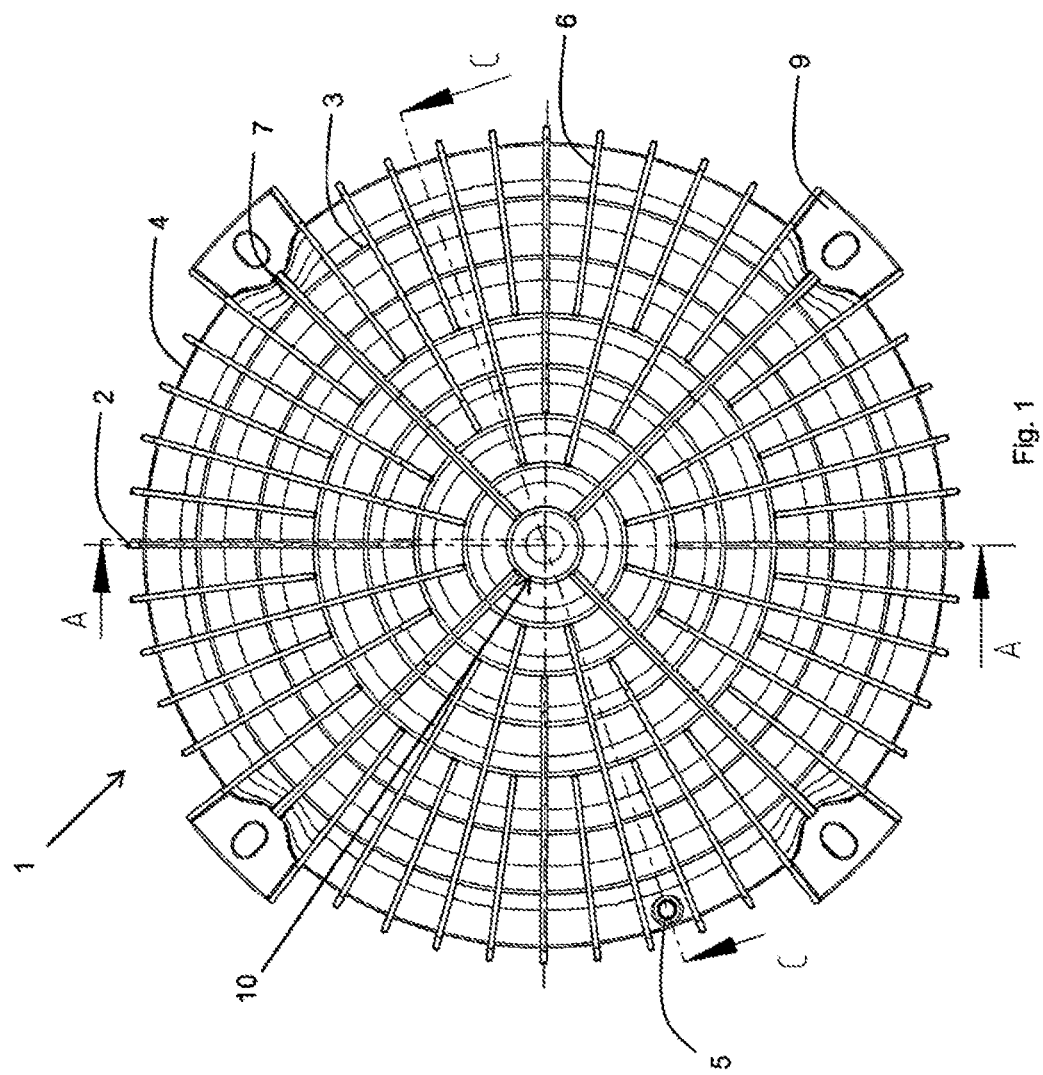
FIG. 1 shows a top view onto an exemplary embodiment of a current rectifier.
Figure 2:
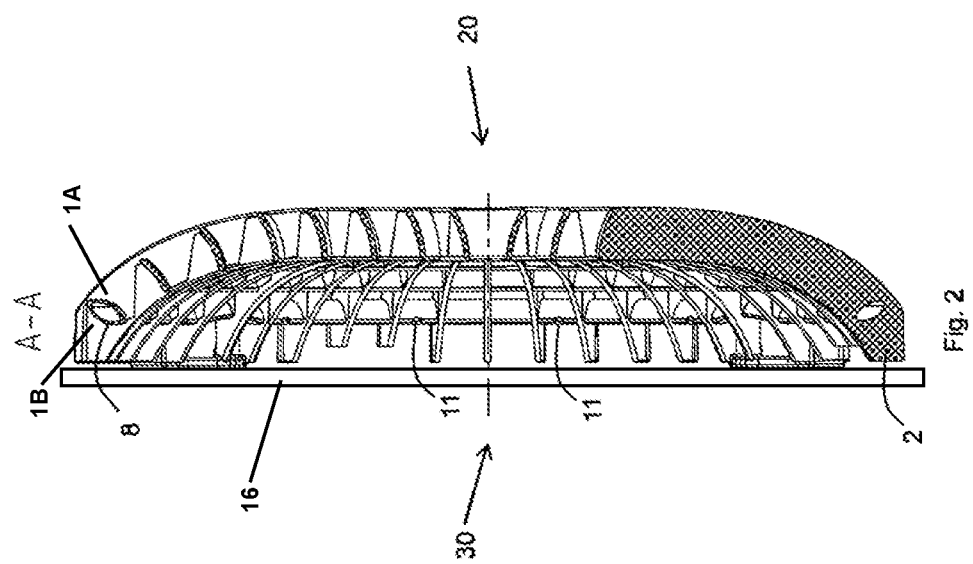
FIG. 2 shows a sectional view A-A of the current rectifier from FIG. 1.
Figure 3:
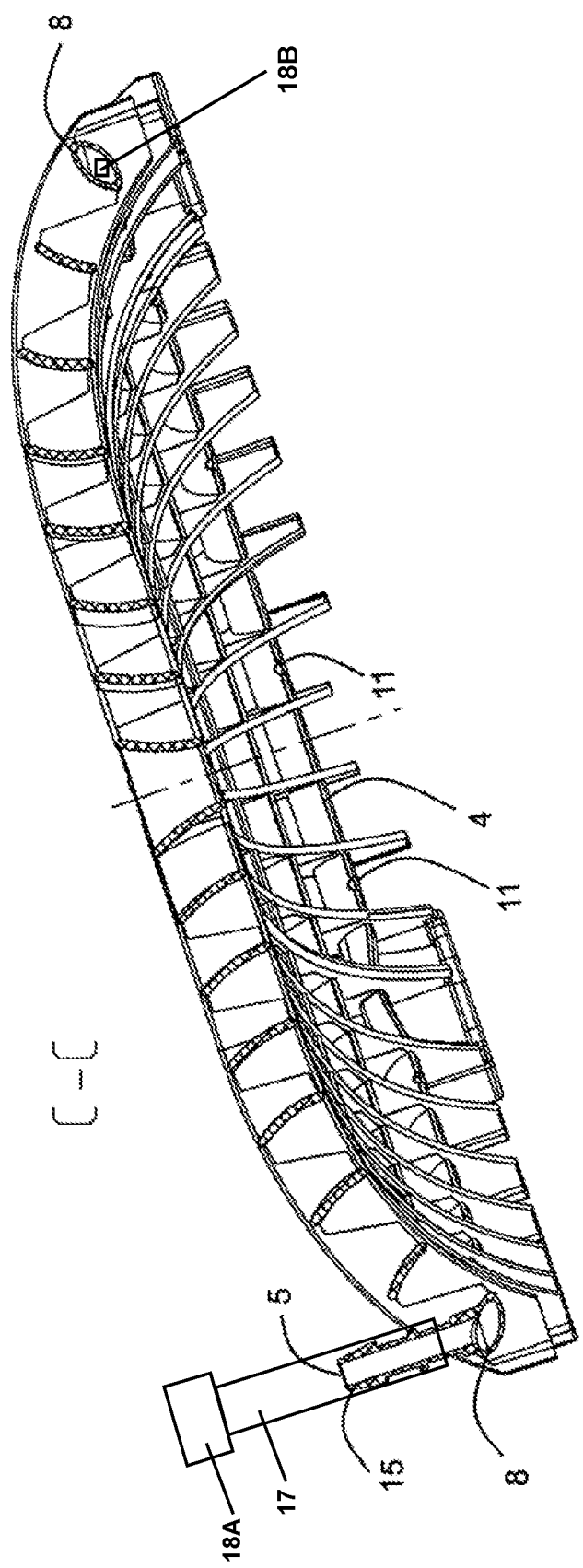
FIG. 3 shows a sectional view C-C of the current rectifier from FIG. 1.

FIGS. 1 to 3 shows an exemplary embodiment of a current rectifier constructed as preliminary line grid 1 for the fastening arrangement at the initial flow side of a ventilator 16 in a top view onto the axial inflow side 20. The fixing of the preliminary line grid 1 on the ventilator takes place by screws (not shown) via the four fastening flanges 9.

The preliminary line grid 1 comprises a plurality of circumferential struts 3, 4 running concentrically to each other which are connected by a plurality of radial struts 6, 7 of different lengths relative to their radially outer ends 2. In the exemplary embodiment shown the pressure measuring conduit 8 is constructed inside the radially outermost circumferential struts 4 and extends by 360 degrees over their entire circumferential, forming an annular conduit in the circumferential strut 4. As can be recognized in the sectional views according to the FIGS. 2 and 3, several openings 11 facing the exit flow side 30 are constructed on the circumferential strut 4 at the same distance from each other in the circumferential direction which openings are directly connected to the pressure measuring conduit 8 and therefore the same static pressure is present in the pressure measuring conduit 8 as in the area of the openings 11. The circumferential struts 3, 4 are inclined toward the axis of rotation, wherein the openings 11 are constructed on the edge of the circumferential strut 4 which edge faces the exit flow side 30. A measuring opening 5 with a direct connection to the pressure measuring conduit 8 is formed on the side of the preliminary line grid 1 facing the axial inflow side 20 on the pressure measuring conduit 8 via a connection piece 15 formed in one piece on the preliminary line grid 1. A hose 17 can be inserted on the connection piece 15 so that the static pressure in the pressure measuring conduit 8 can be measured at a distance from the preliminary line grid 1 by the pressure sensor 18A.

The previously disclosed variant of an embodiment with a pressure sensor 18B integrated in a strut can be directly transferred onto the shown exemplary embodiment if the dimensioning of the circumferential strut 4 and therefore of the pressure conduit 8 are sufficiently large.

Openings 11 are provided exclusively in the circumferential strut 4 in the exemplary embodiment according to FIGS. 1-3. As a modification to the above, corresponding openings facing the exit flow side 30 in exemplary embodiments which are not shown can be additionally or alternatively provided in the radial struts 7 extending over the entire radial length. The radial struts 7 are constructed as hollow struts and form a hollow space which serves for its part as a pressure measuring conduit. The radial struts 7 and their hollow conduits are connected in the axial central area by a hollow annular element 10 so that the same static pressure prevails in all hollow spaces. The measuring opening 5 is shifted in an embodiment to the hollow annular element 10 with a pressure measuring conduit only in the radial struts 7. The other features can be used in an identical manner.

The current rectifier is constructed in an embodiment in a bipartite manner by a first partial element 1A and a second partial element 1B. This facilitates the mounting. In addition, it can be provided that the pressure measuring conduit or annular conduit is constructed partially in the first partial element 1A and partially in the second partial element 1B and forms a through pressure measuring space by connecting the first and the second partial elements.

The invention claimed is:

1. A current rectifier configured for being arranged at a suction area of a ventilator, the ventilator having an axial inlet flow side and an axial exit flow side, wherein the current rectifier comprises a plurality of crossing struts formed by at least one circumferential strut and at least one radial strut, and a pressure measuring conduit is constructed in at least one of the at least one circumferential strut and the at least one radial strut, the pressure measuring conduit having at least one strut opening facing in a direction towards the axial exit flow side of the ventilator, and wherein the current rectifier comprises at least one of:
   a connection piece connected to the pressure measuring conduit and having a measuring opening for connecting a hose and an external pressure sensor to the pressure measuring conduit; and
   an internal pressure sensor integrated into the pressure measuring conduit.

2. The current rectifier according to claim 1, wherein the pressure measuring conduit comprises several uniformly distributed strut openings facing in the direction towards the axial exit flow side.

3. The current rectifier according to claim 1, wherein the pressure measuring conduit is circumferential and annular.

4. The current rectifier according to claim 3, wherein the current rectifier comprises a plurality of circumferential struts, and wherein the pressure measuring conduit is constructed in a radially outermost circumferential strut of the plurality of circumferential struts.

5. The current rectifier according to claim 3, wherein the at least one strut opening facing in the direction towards the axial exit flow side is constructed as a plurality of slots.

6. The current rectifier according to claim 1, wherein the at least one radial strut is constructed as a hollow strut with a hollow space and includes at least one strut opening facing in the direction towards the axial exit flow side.

7. The current rectifier according to claim 6, wherein the current rectifier comprises a plurality of radial struts constructed as hollow struts with hollow spaces of which extend into an axial center of the current rectifier, and wherein the hollow spaces of each of the hollow struts are connected at the axial center of the current rectifier by a hollow annular element.

8. The current rectifier according to claim 1, wherein the current rectifier is constructed in a bipartite manner by a first partial element and a second partial element.

9. The current rectifier according to claim 8, wherein the pressure measuring conduit includes at least one circumferential strut constructed partially in the first partial element and partially in the second partial element and forms a through-pressure measuring space by connecting the first and the second partial elements.

10. The current rectifier according to claim 1, wherein the measuring opening of the connection piece receives the hose that is connected to the external pressure sensor.

11. A ventilator comprising:
an axial inlet flow side defining a suction area and an axial exit flow side; and
a current rectifier fastened to the ventilator at the suction area, the current rectifier having a plurality of crossing struts formed by at least one circumferential strut and at least one radial strut, wherein a pressure measuring conduit is constructed in at least one of the at least one circumferential strut and the at least one radial strut, the pressure measuring conduit having at least one strut opening facing in a direction towards the axial exit flow side, and wherein the current rectifier comprises at least one of:
a connection piece connected to the pressure measuring conduit and having a measuring opening for connecting a hose and an external pressure sensor to the pressure measuring conduit; and
an internal pressure sensor integrated into the pressure measuring conduit.

12. The ventilator according to claim 11, wherein the pressure measuring conduit is circumferential and annular.

13. The ventilator according to claim 12, wherein the current rectifier comprises a plurality of circumferential struts, and wherein the pressure measuring conduit is constructed in a radially outermost circumferential strut of the plurality of circumferential struts.

14. The ventilator according to claim 11, wherein the at least one radial strut is constructed as a hollow strut with a hollow space and includes at least one strut opening facing in the direction towards the axial exit flow side.

15. The ventilator according to claim 14, wherein the current rectifier comprises a plurality of radial struts constructed as hollow struts with hollow spaces of which extend into an axial center of the current rectifier, and wherein the hollow spaces of each of the hollow struts are connected at the axial center of the current rectifier by a hollow annular element.

16. The current rectifier according to claim 3, wherein the at least one strut opening facing in the direction towards the axial exit flow side is constructed as a slot that extends completely circumferentially around the pressure measuring conduit.

17. The current rectifier according to claim 1, wherein at least one of the at least one circumferential strut and the at least one radial strut defines the pressure measuring conduit and is entirely formed as a tubular member.

18. The ventilator according to claim 11, wherein at least one of the at least one circumferential strut and the at least one radial strut defines the pressure measuring conduit and is entirely formed as a tubular member.

19. The current rectifier according to claim 1, wherein the at least one strut opening is formed at a surface of at least one of the at least one circumferential strut and the at least one radial strut.

20. The ventilator according to claim 11, wherein the at least one strut opening is formed at a surface of at least one of the at least one circumferential strut and the at least one radial strut.

* * * * *